(12) United States Patent
Wang et al.

(10) Patent No.: US 8,495,111 B1
(45) Date of Patent: Jul. 23, 2013

(54) SYSTEM AND METHOD OF HIERARCHICAL SPACE MANAGEMENT FOR STORAGE SYSTEMS

(75) Inventors: Feng Wang, Sunnyvale, CA (US); John A. Colgrove, Los Altos, CA (US); Bo Hong, Mountain View, CA (US); Oleg Kiselev, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 763 days.

(21) Appl. No.: 12/236,194

(22) Filed: Sep. 23, 2008

Related U.S. Application Data

(60) Provisional application No. 60/976,305, filed on Sep. 28, 2007.

(51) Int. Cl.
*G06F 17/30* (2006.01)

(52) U.S. Cl.
USPC ............ 707/829; 707/823; 707/824; 707/830

(58) Field of Classification Search
None
See application file for complete search history.

(56) References Cited

U.S. PATENT DOCUMENTS

| | | | |
|---|---|---|---|
| 5,828,876 A | | 10/1998 | Fish et al. |
| 5,875,444 A | | 2/1999 | Hughes |
| 6,058,400 A | | 5/2000 | Slaughter |
| 6,175,900 B1 | * | 1/2001 | Forin et al. .................... 711/156 |
| 6,640,290 B1 | * | 10/2003 | Forin et al. .................... 711/156 |
| 7,093,086 B1 | | 8/2006 | van Rietschote |
| 7,293,154 B1 | * | 11/2007 | Karr et al. ..................... 711/202 |
| 7,437,528 B1 | * | 10/2008 | Moore et al. .................. 711/170 |
| 7,660,837 B2 | * | 2/2010 | Rajakarunanayake . 707/999.205 |
| 7,860,896 B2 | * | 12/2010 | Rajakarunanayake ........ 707/802 |
| 2007/0022148 A1 | * | 1/2007 | Akers et al. ................... 707/205 |

* cited by examiner

*Primary Examiner* — Debbie Le
(74) *Attorney, Agent, or Firm* — Rory D. Rankin; Meyertons, Hood, Kivlin, Kowert & Goetzel, P.C.

(57) ABSTRACT

A system and method for storing data. In one embodiment, a storage system includes a resource manager and a hierarchical entry tree describing storage entities of the storage system. At each given level of the tree higher than the bottom level, metadata entries summarize storage availability at a level below the given level. The resource manager receives a request to store data of a target size at a target location corresponding to a first portion of the entry tree and scans the entry tree to determine if contiguous, free storage entities of the target size are available at the target location. In response to determining that contiguous, free storage entities of the target size are not available at the target location, the resource manager scans portions of the entry tree outside the first portion to identify contiguous, free storage entities of the target size, where it stores the data.

20 Claims, 11 Drawing Sheets

SYSTEM AND METHOD OF HIERARCHICAL SPACE MANAGEMENT FOR STORAGE SYSTEMS

CROSS REFERENCE TO RELATED APPLICATIONS

This application claims the benefit of priority to U.S. Provisional Patent Application No. 60/976,305, entitled "A System And Method Of Hierarchical Space Management For Storage Systems," filed Sep. 28, 2007, the entirety of which is incorporated herein by reference.

BACKGROUND OF THE INVENTION

1. Field of the Invention

This invention relates to computer systems and, more particularly, to resource management of data storage systems within computer systems.

2. Description of the Related Art

Computer data storage systems are becoming increasingly large. To increase storage capacity, several storage devices may be grouped together into a global resource pool. Conventionally, the storage resources of these devices may be treated as a flat, static system in which resources are allocated globally and without constraint. As the size of the data storage system becomes larger, scalability problems may arise for a variety of storage system operations. Generally speaking the global resource pool may allocate small storage entities such as blocks or extents for data storage use. Consequently, allocation of resources may be very slow and may require extensive searches of the global resource pool.

Also, in conventional file systems, the amount of time needed to repair a damaged file system may, at best, grow proportionately with the size of storage system metadata. Since resources are allocated globally, an error may affect any portion of the file system, necessitating exhaustive consistency checking. In other words, the fault domain may be the entire file system. To support utilities such as the well known File System Consistency Checker (FSCK), global metadata tracking tables may have to be maintained. During operation of FSCK, these tracking tables must be accessible. Consequently, stress is placed on the virtual memory subsystem and it may be difficult to parallelize consistency-checking operations. While repairs are taking place, the storage system is generally taken offline, resulting in unacceptably long periods during which the stored data is not accessible.

A large storage system may be partitioned into many smaller systems to make error recovery faster. However, it may be difficult to manage the overhead of management metadata needed to permit partitions to expand and shrink dynamically, particularly when multiple, non-contiguous storage devices are incorporated in the storage system. In view of the above, a more effective system and method for dynamically managing the resources of a file system that account for these issues are desired.

SUMMARY OF THE INVENTION

Various embodiments of a storage system and methods are disclosed. In one embodiment, a storage system includes a resource manager and a hierarchical entry tree describing storage entities of the storage system. At each given level of the tree higher than the bottom level, storage entity metadata entries summarize storage availability at a level below the given level. The resource manager is configured to receive a request to store data of a target size at a target location corresponding to a first portion of the entry tree and scan the entry tree to determine if contiguous, free storage entities of the target size are available at the target location. In response to determining that contiguous, free storage entities of the target size are not available to store the data at the target location, the resource manager is further configured to scan portions of the entry tree outside the first portion to identify contiguous, free storage entities of the target size and store the data in the identified, contiguous, free storage entities. In one embodiment, storage in the storage system is based on variably sized extents.

In a further embodiment, the resource manager is configured to detect that an error has occurred in a particular portion of the entry tree and use metadata entries from a level below the particular portion of the entry tree to repair the error at the particular portion of the entry tree. In a still further embodiment, to scan portions of the entry tree outside the first portion of the storage system, the resource manager is further configured to traverse up to a next level in the entry tree and scan the entry tree from the next level toward the bottom of the entry tree to find contiguous, free storage entities of the target size. If contiguous, free storage entities are not found, the resource manager is configured to scan the entry tree from one or more higher levels than the next level to find free storage entities of the target size.

In a still further embodiment, the entry tree further comprises one or more containers. Each storage entity is associated with a container of the one or more containers. The first portion of the entry tree comprises a particular one of the one or more containers. If after scanning to a highest level of the entry tree, contiguous, free storage entities of the target size are not found, the resource manager is further configured to associate one or more additional storage entities with the particular container.

In a still further embodiment, the resource manager is configured to receive a request to shrink a first container. In response to the request to shrink a first container, the resource manager is further configured to scan a first portion of the entry tree corresponding to the first container, identify one or more storage entities of a sufficient size to satisfy the request to shrink the first container, and remove the association between the identified one or more storage entities and the first container.

These and other embodiments will become apparent upon consideration of the following description and accompanying drawings.

Figure 1:
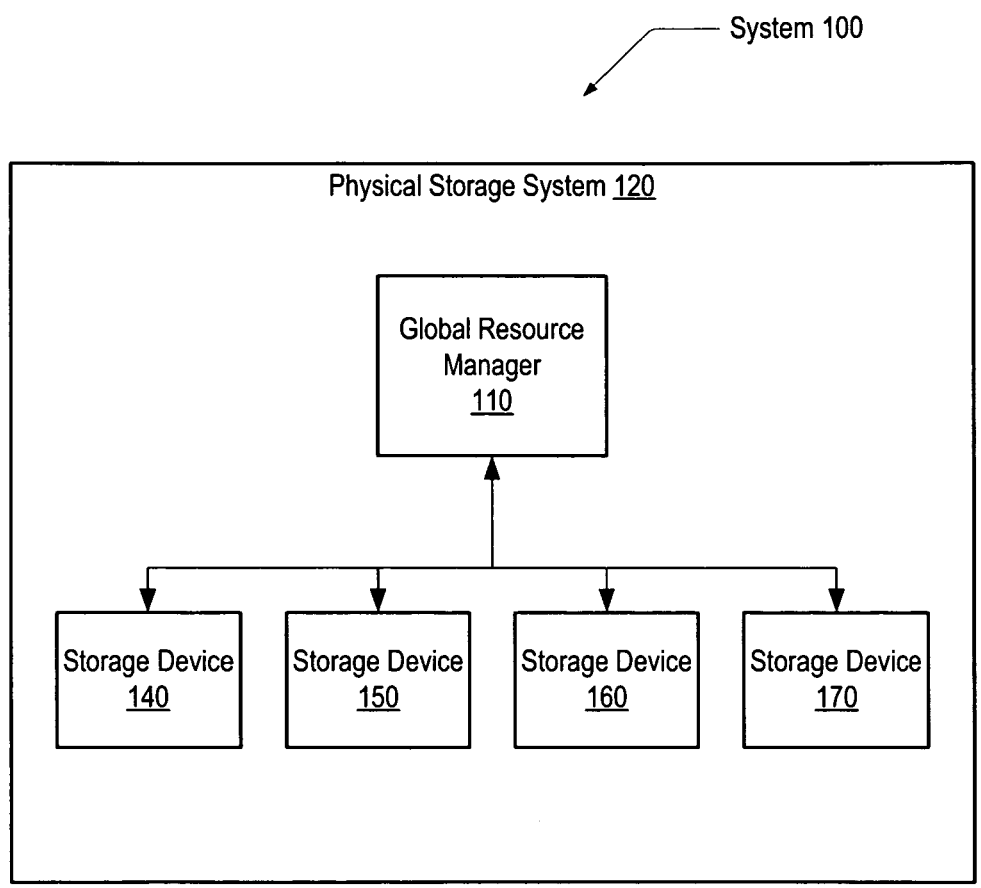
FIG. 1 illustrates one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates one embodiment of a computer system 100. As shown, system 100 includes a physical storage system 120. Physical storage system 120 may include a global resource manager 110 coupled to storage devices 140, 150, 160, and 170, each of which may include one or more data storage devices such as hard disks or CD-ROMs, etc. Physical storage system 120 may also be coupled to one or more processing elements (not shown) or other standard computer system components. In an alternative embodiment, global resource manager 110 may be located within one of these other processing elements. In further alternative embodiments, any number of storage devices may be included in physical storage system 120 instead of or in addition to those illustrated.

Global resource manager 110 may be responsible for allocating resources of physical storage system 120 such as inodes, blocks, extents, or other physical units of metadata and data storage. Global resource manager 110 may also maintain data structures that track resource allocation. In addition, global resource manager 110 may track the status of physical storage system 120 and detect and correct errors that may arise due to aborted operations, software bugs, sudden power interruption, etc. Global resource manager 110 may be implemented in hardware, software, or a combination thereof.

Figure 2:
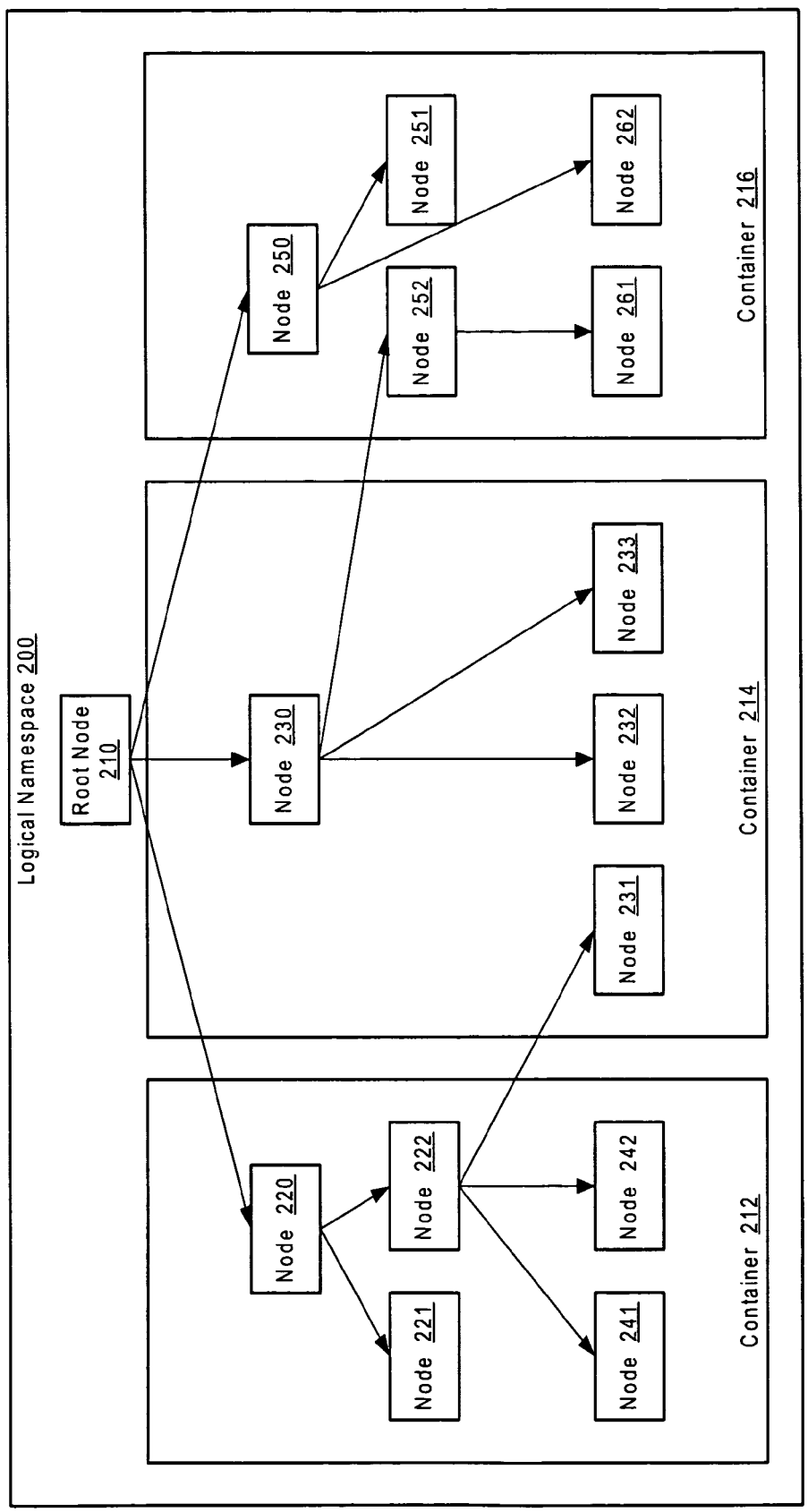
FIG. 2 illustrates one embodiment of logical namespace.

FIG. 2 illustrates one embodiment of logical namespace 200. In the illustrated embodiment, namespace 200 begins with a root node 210 and includes nodes 220-222, 230-233, 241, 242, 250-252, 261, and 262. Nodes 220, 230, and 250 may be linked to root node 210, nodes 221 and 222 may be linked to node 220, nodes 231, 241, and 242 may be linked to node 222, nodes 232, 233, and 252 may be linked to node 230, node 261 may be linked to node 252, and nodes 251 and 262 may be linked to node 250. Nodes may be linked in a hierarchy of levels. For example, nodes 220, 230, and 250 may form a second level of a hierarchy, nodes 221, 222, 251 and 252 a third level, etc. In alternative embodiments, namespace 200 may include many more nodes and many more levels than the ones shown in FIG. 2, including less than or more than two nodes linked to the root node.

Logical namespace 200 may be partitioned into a set of containers in order to isolate errors and speed error recovery. A container, as used herein, is a dynamically created, variable-sized portion of a storage system that includes a number of allocated units of data storage and associated units of metadata storage. For example, in the illustrated embodiment, logical namespace 200 is shown partitioned into containers 212, 214, and 216. Container 212 includes nodes 220-222, 241, and 242. Container 214 includes nodes 230-233. Container 216 includes nodes 250-252, 261, and 262. Many more containers and associated nodes may be included in alternative embodiments.

During operation, when data is to be stored in system 100, a user may select a target location such as a particular container within logical namespace 200. The target location in logical namespace 200 may be mapped to one or more allocation units that correspond to physical locations in storage system 120. Each allocation unit may consist of one or more storage entities such as fixed-size blocks or variable-sized extents located within one or more storage devices. For purposes of discussion, these entities may be referred to hereinafter as extents, although the systems and methods described may be equally applied to blocks or other units of storage, whether fixed-size or variable-sized as well. Multiple extents may be contiguous or non-contiguous. Global resource manager 110 may manage the allocation of resources within storage system 120 and perform maintenance operations such as detecting and correcting metadata errors and other inconsistencies in storage system 120 according to processes that will be described further below. A variety of data structures will be described that may be used by global resource manager 110 to manage allocation units, their constituent extents, and higher level partitions of system 100.

Figure 3:
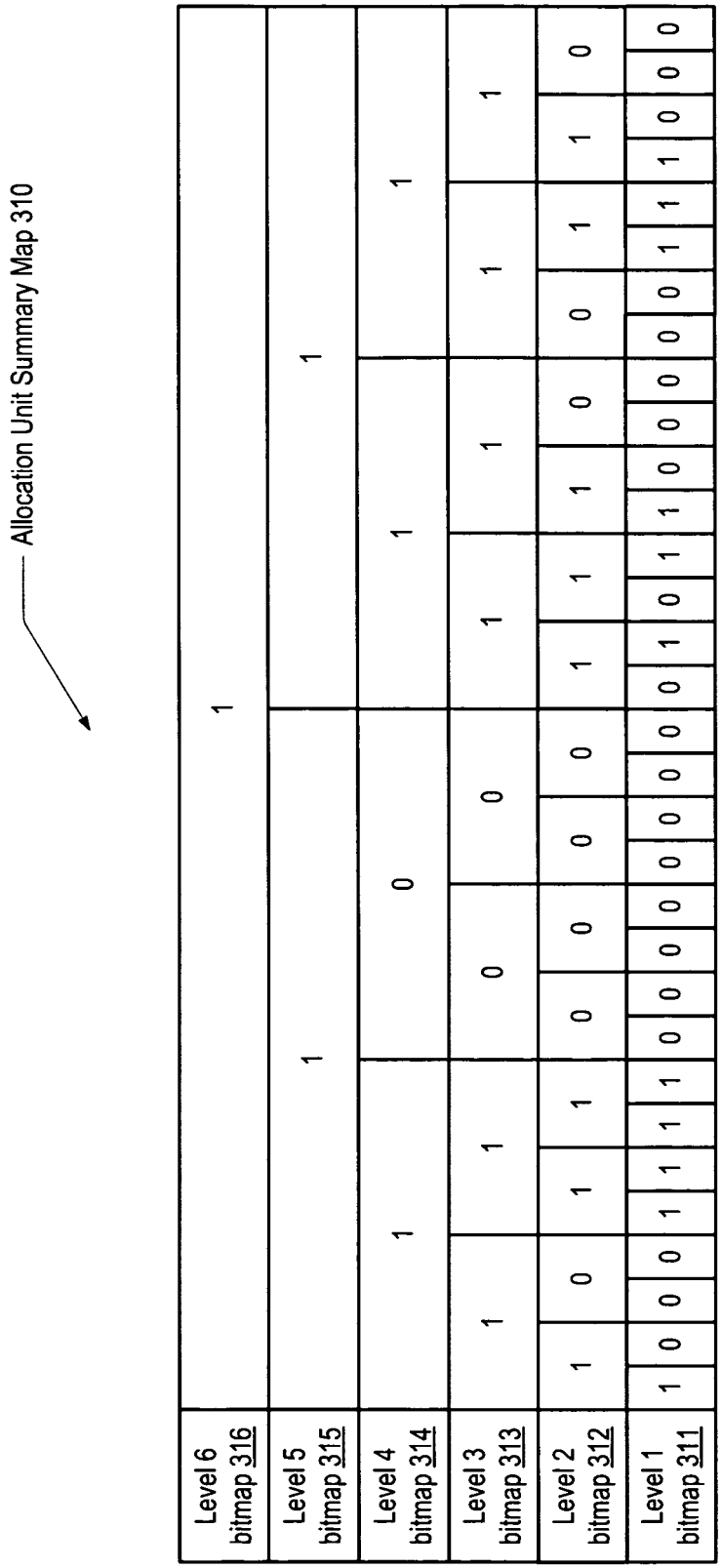
FIG. 3 illustrates one embodiment of an allocation unit summary map.

Turning now to FIG. 3, one embodiment of an allocation unit summary map 310 is shown. Map 310 may be used to track the allocation state of the storage entities that are included in an associated allocation unit. In the illustrated embodiment, map 310 includes 6 rows. The bottom row, level 1 bitmap 311, includes 32 bit positions, each corresponding to an extent within the associated allocation unit. By convention, in one embodiment, a "1" value in a bit position indicates that the corresponding storage entity is not free and a "0" value indicates that the corresponding storage entity is free. In alternative embodiments, the assignment of values to bit positions may of course have the reverse interpretation without loss of generality. Level 2 bitmap 312 includes sixteen bit positions, one for every two bit positions in level 1 bitmap 311. A "1" value in a bit position in level 2 bitmap 312 may indicate that one or both of the bit positions below it in level 1 bitmap 311 have a "1" value. Otherwise the bit position in level 2 bitmap 312 may have a "0" value. Similarly, Level 3 bitmap 313 includes eight bit positions, one for every two bit positions in level 2 bitmap 312. A "1" value in a bit position in level 3 bitmap 313 may indicate that one or both of the bit positions below it in level 2 bitmap 312 have a "1" value. Otherwise the bit position in level 3 bitmap 313 may have a "0" value. Level 4 bitmap 314 includes four bits positions, level 5 bitmap 315 includes two bit positions, and level 6 bitmap 316 includes one bit position. Generally speaking, as the level increases in map 310, the number of bit positions decreases by a factor of two and the value of each bit position may be a logical "OR" of the two bit positions one level below it. In alternative embodiments, a summary map may have more than or fewer than six rows, depending on the number of storage entities that are included in an allocation unit. A six-level summary map is sufficient to describe the state of an allocation unit with up to thirty-two extents, a seven-level summary map is sufficient to describe the state of an allocation unit with up to sixty-four extents, etc.

In a large storage system, each allocation unit may have an associated allocation unit summary map. Within an allocation unit, the size of free extents may be quickly determined from the summary map by scanning from the top level down. When a value of zero is encountered, the number of free contiguous extents may be determined to be at least equal to $2^N$ where N is equal to the level in the summary map where the zero value is encountered. Summary maps may be linked together in higher order structures to describe the state of a larger set of allocation units. These linked sets of summary maps may be referred to as an entry tree.

Figure 4:
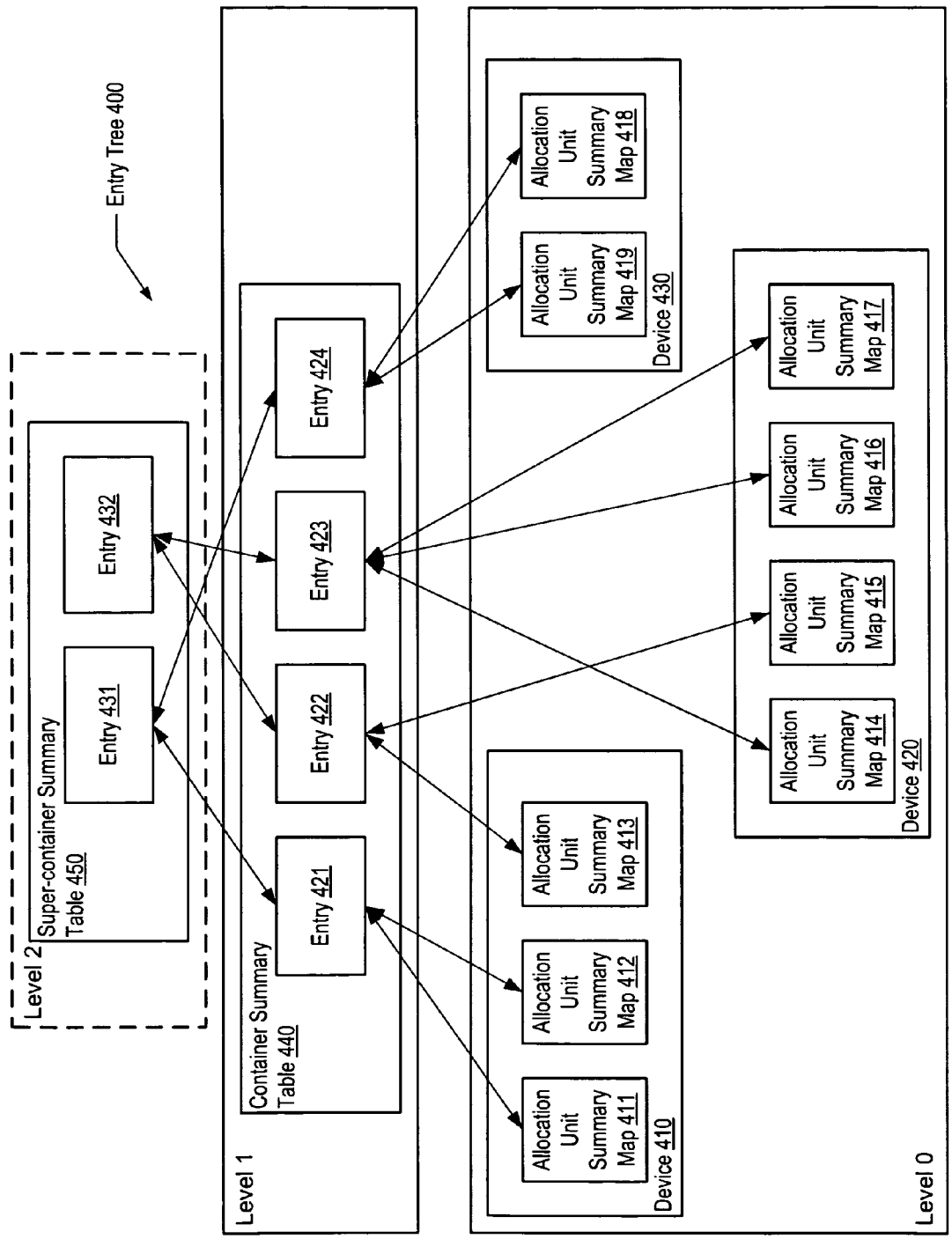
FIG. 4 illustrates one embodiment of an entry tree.

FIG. 4 illustrates one embodiment of an entry tree 400. Entry tree 400 includes a variety of data structures organized in levels. For example, Level 0 includes allocation unit summary maps 411-419, level 1 includes container summary table 440, and level 2 includes super-container summary table 450. Each of allocation unit summary maps 411-419 may include data such as that illustrated in allocation unit summary map 310. Allocation unit summary maps 411-413 may be associated with allocation units within a storage device 410, allocation unit summary maps 414-417 may be associated with allocation units within a storage device 420, and allocation unit summary maps 418-419 may be associated with allocation units within a storage device 430. Each of storage devices 410, 420, and 430 may be associated with an allocation unit ownership table (not shown) and an allocation unit state table (not shown), which will be described in further detail below. Container summary table 440 may include entries 421-424. Super-container summary table 450 may include entries 431 and 432. Each entry in a container summary table or a super-container summary table may include a summary containing data similar to that illustrated in allocation unit summary map 310. Detailed descriptions of embodiments of entries in a container summary table and a super-container summary table are presented below. The elements of entry tree 400 may be linked hierarchically. More specifically, an entry in a super-container summary table may be linked bidirectionally to one or more entries in a container summary table, which in turn may be linked bidirectionally to one or more allocation unit summary maps such that the entry tree describes the relationships among a large set of allocation units. Accordingly, entry tree 400 may include a collection of linked summary maps that describe the availability of extents throughout a storage system.

A container, as defined above, may be said to own one or more allocation units. Similarly, a super-container may be said to own one or more containers. In further embodiments, many more levels, allocation units, containers, and/or super-containers beyond those illustrated in FIG. 4 may be included in an entry tree and its associated hierarchy. In still further embodiments, even larger hierarchies may be created in which higher-level containers may be said to own lower level containers. For example, a level-3 container may be said to own one or more super-containers, a level-4 container may be said to own one or more level-3 containers, etc.

Containers may be used to isolate ownership of allocation units and their extents or blocks. For example, in one embodiment, data entities that refer to each other, such as files and their parent directories, may be owned by the same container. In a further embodiment, containers may be connected via links if a particular condition is detected such as the first container not having sufficient resources for the additional stored data. Such a condition may be referred to as an overflow and the second container referred to as a linked container. For example, in one embodiment, a linked container may be added when adding more storage to the first container would require it to manage more than a pre-determined maximum number of allocation units, extents, blocks, etc. In various embodiments, the criteria defining whether resources are sufficient may include any desired criteria instead of or in addition to availability of storage resources and may be determined by policy, dynamically by user input, or by any other desired means. Super-containers may be similarly used to isolate ownership of containers and their allocation units, etc., for higher levels of a hierarchy. When data is to be stored in a storage system, the data structures of an entry tree may be used to locate free extents in which to store the data where the data to be stored has an affinity to a container, a super-container, or other stored data. Processes that may use an entry tree during a data storage operation are described further below.

Figure 5:
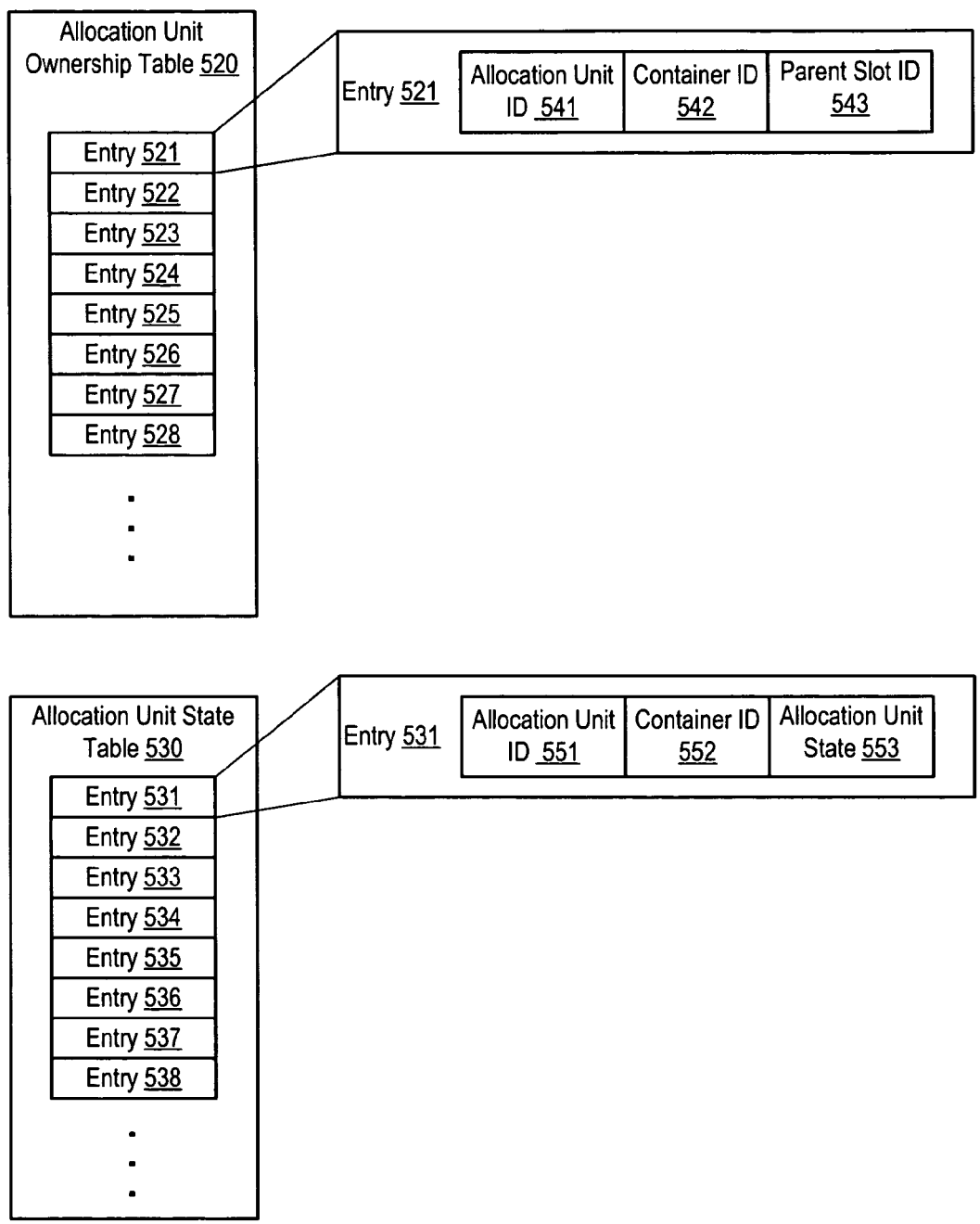
FIG. 5 illustrates one embodiment of an allocation unit ownership table and an allocation unit state table that may be associated with a storage device.

FIG. 5 illustrates one embodiment of an allocation unit ownership table 520 and an allocation unit state table 530 that may be associated with a storage device. Allocation unit ownership table 520 may include entries 521-528, etc. Each entry corresponds with an allocation unit that has been allocated within an associated storage device. An entry may be added to the table each time an allocation unit is allocated from a storage device. To illustrate the elements of each entry, entry 521 is shown in greater detail. Entry 521 may include an allocation unit ID 541, a container ID 542, and a parent slot ID 543. Allocation unit ID 541 may be used as a table index or to distinguish among the allocation units in a storage system. Container ID 542 may indicate to which container an allocation unit is allocated. In one embodiment, allocation units from a given storage device may be owned by different containers and a given container may own allocation units from different storage devices. Container ID 542 may be used to track these ownership relationships. For any given entry, parent slot ID 543 may be a reverse link to the location in a level 1 summary that corresponds with the container that owns the allocation unit associated with the given entry. Allocation unit state table 530 may include entries 531-538, etc. Each entry corresponds with an allocation unit that has been allocated within an associated storage device. An entry may be added to the table each time an allocation unit is allocated from a storage device. To illustrate the elements of each entry, entry 531 is shown in greater detail. Entry 531 may include an allocation unit ID 551, a container ID 552, and an allocation unit state 553. Allocation unit ID 551 and container ID 552 may have the same functions as allocation unit 541 and container ID 542, described above. For any given entry, allocation unit state 553 may indicate one of a variety of states such as whether the associated allocation unit is free, allocated, dirty, expanded, etc.

Figure 6:
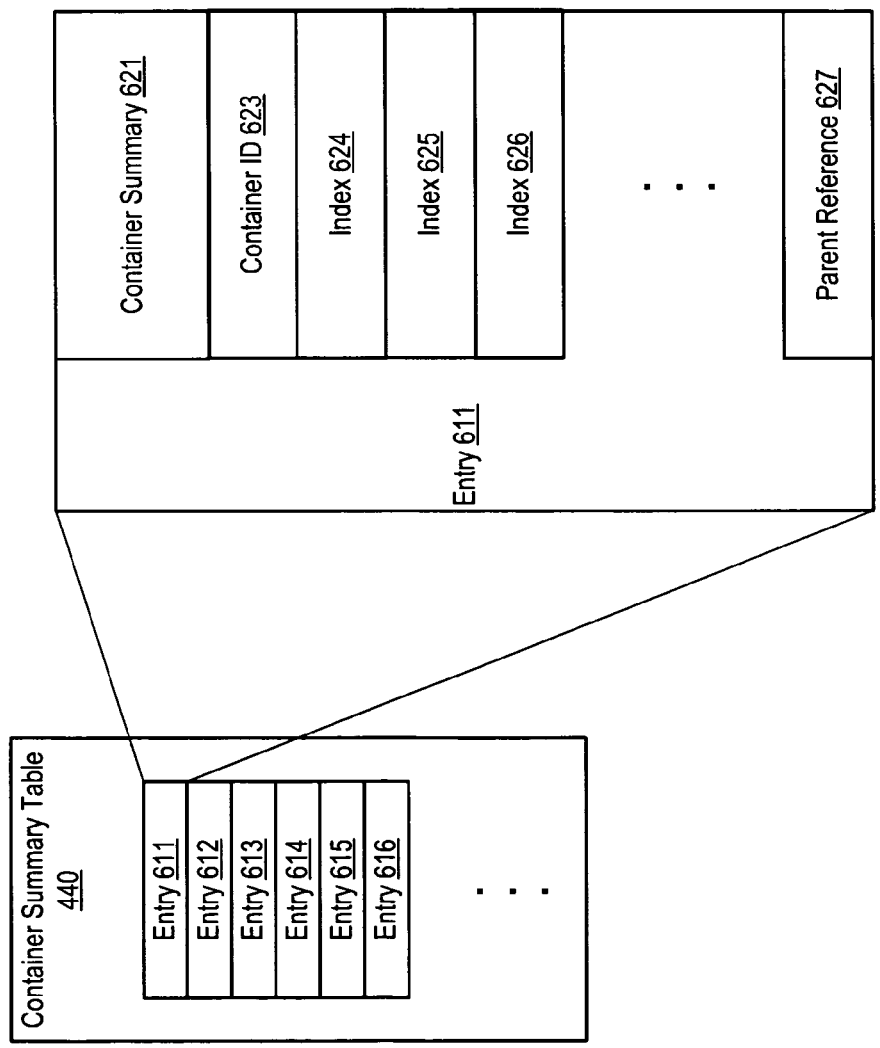
FIG. 6 illustrates one embodiment of a container summary table entry.

FIG. 6 illustrates one embodiment of a container summary table entry 440. Container summary table 440 may include entries 611-616, etc. each of which may correspond with a container in a storage system. An entry may be added to the table each time a container is added to the storage system. To illustrate the elements of each entry, entry 611 is shown in greater detail. Entry 611 may include a container summary 621, a container ID 623, one or more indices such as the illustrated indices 624, 625, and 626, and parent reference 627. Container summary 621 is similar to an allocation unit summary map such as map 310 of FIG. 3. Container summary 621 may be used to track the allocation state of the allocation units that are owned by an associated container. Using a pattern similar to that described above, container summary 621 may include a level 1 bitmap in which each bit position corresponds to an allocation unit within the associated container. By convention, in one embodiment, a "1" value in a bit position indicates that the corresponding allocation unit is not free and a "0" value indicates that the corresponding allocation unit is free. In alternative embodiments, the assignment of values to bit positions may of course have the reverse interpretation without loss of generality. Container summary 621 may have additional, higher level bitmaps in which as the level increases, the number of bit positions decreases by a factor of two and the value of each bit position may be a logical "OR" of the two bit positions one level below it. Within a container, the size of free extents may be quickly determined from the container summary by scanning from the top level down. When a value of zero is encountered, the number of free contiguous allocation units may be determined to be at least equal to $2^N$ where N is equal to the level in the summary where the zero value is encountered.

Container ID 623 may be used as a table index or to distinguish among the containers in a storage system. Each of indices 624, 625, and 626 may refer to an allocation unit summary map that corresponds with an allocation unit owned by the associated container. An index may be added to the container summary table entry when an allocation unit is added to the associated container. For any given entry, parent reference 627 may be a reverse link to the entry in a super-container summary table that corresponds with the super-container that owns the container associated with the given entry.

Figure 7:
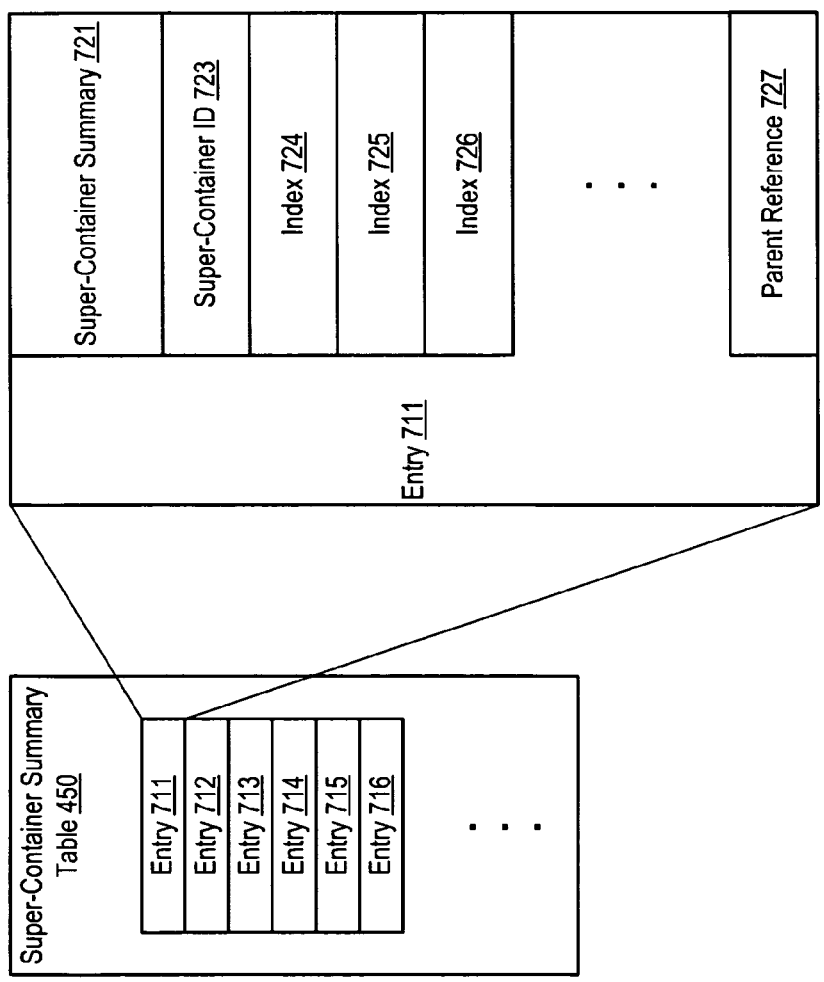
FIG. 7 illustrates one embodiment of a super-container summary table entry.

FIG. 7 illustrates one embodiment of a super-container summary table entry 450. Container summary table 450 may include entries 711-716, etc. each of which may correspond with a super-container in a storage system. An entry may be added to the table each time a super-container is added to the storage system. To illustrate the elements of each entry, entry 711 is shown in greater detail. Entry 711 may include a super-container summary 721, a super-container ID 723, one or more indices such as the illustrated indices 724, 725, and 726, and parent reference 727. Super-container summary 721 is similar to an allocation unit summary map such as map 310 of FIG. 3. Super-container summary 721 may be used to track the allocation state of the containers that are owned by an associated super-container. Using a pattern similar to that described above, super-container summary 721 may include a level 1 bitmap in which each bit position corresponds to a container within the associated super-container. By convention, in one embodiment, a "1" value in a bit position indicates that the corresponding container is not free and a "0" value indicates that the corresponding container is free. In alternative embodiments, the assignment of values to bit positions may of course have the reverse interpretation without loss of generality. Super-container summary 721 may have additional, higher level bitmaps in which as the level increases, the number of bit positions decreases by a factor of two and the value of each bit position may be a logical "OR" of the two bit positions one level below it. Within a super-container, the size of free extents may be quickly determined from the super-container summary by scanning from the top level down. When a value of zero is encountered, the number of free contiguous containers may be determined to be at least equal to $2^N$ where N is equal to the level in the summary where the zero value is encountered.

Super-container ID 723 may be used as a table index or to distinguish among the super-containers in a storage system. Each of indices 724, 725, and 726 may refer to a container summary table that corresponds with a container owned by the associated super-container. An index may be added to the super-container summary table entry when a container is added to the associated super-container. For any given entry, parent reference 727 may be a reverse link to the entry in a higher-level summary table that corresponds with the higher-level container that owns the super-container associated with the given entry.

The previously described entry tree 400 and its associated tables and summaries contain redundant information that may be used in a variety of storage system management operations. For example, the entry tree may be used to locate free storage space of a desired size, from a single block or extent to a much larger partitioned region such as a container or super-container. In addition, the redundant information may be used during a variety of error recovery operations. In the following descriptions that accompany FIGS. 8-11, examples of some storage system operations are given. Numerous other examples are possible and are contemplated.

Figure 8:
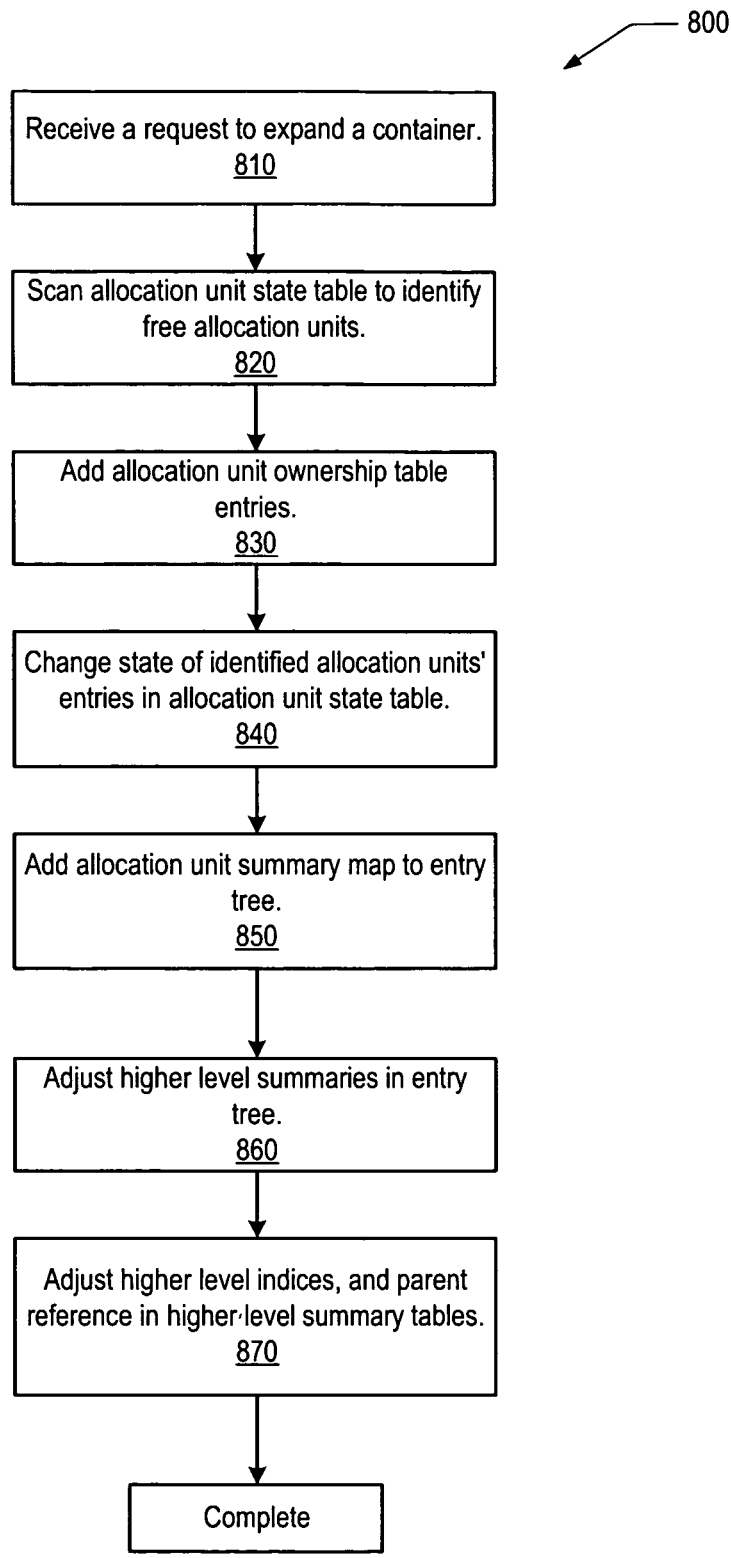
FIG. 8 illustrates one embodiment of a process that may be used to add allocation units to a container.

FIG. 8 illustrates one embodiment of a process 800 that may be used to add allocation units to a container. Similar processes may be used to add smaller or larger sets of storage entities to smaller or larger storage system partitions. Process 800 may begin with the reception of a request to expand a particular container (block 810), such as in the event that a request to store data in the particular container requires more free allocation units than are available. In response to the request, a particular storage device in which to scan for allocation units may be selected by any of a variety of methods, such as a random selection, a round robin algorithm, affinity with previously allocated allocation units in the same container, etc. An allocation unit state table associated with the selected storage device may be scanned to identify one or more contiguous, free allocation units (block 820). The desired number of contiguous, free allocation units may depend on a variety of factors, such as the size of a data set to be stored in the particular container that is targeted for expansion. Once the desired number of contiguous, free allocation units has been identified, a corresponding entry or entries may be added to an allocation unit ownership table to reflect the ownership of the identified allocation units by the particular container (block 830). The value of the state field in the corresponding allocation unit state table entries may also be changed from free to allocated (block 840). An allocation unit summary table may then be added to the entry tree (block 850). Once the newly allocated units have been added to the entry tree, higher-level summaries in the entry tree may be adjusted to include the allocation state of the newly allocated units (block 860). In addition, higher-level indices and parent references in a container summary table may be adjusted to reflect the newly allocated units (block 870), completing process 800. It is noted that in alternative embodiments, the individual blocks illustrated in process 800 may be executed in a different order and/or that some blocks may be executed in parallel with others.

Figure 9:
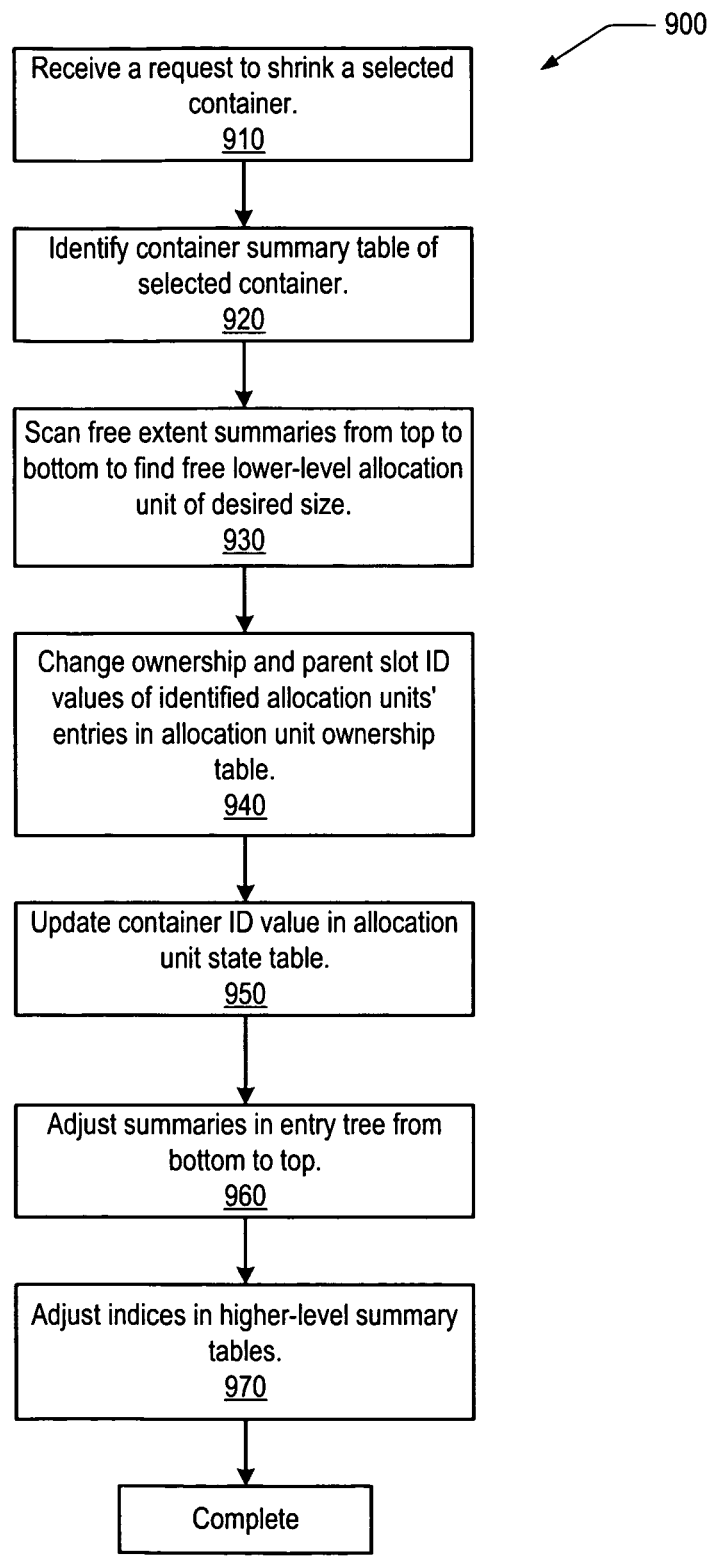
FIG. 9 illustrates one embodiment of a process that may be used to shrink a container using an entry tree.
Figure 10:
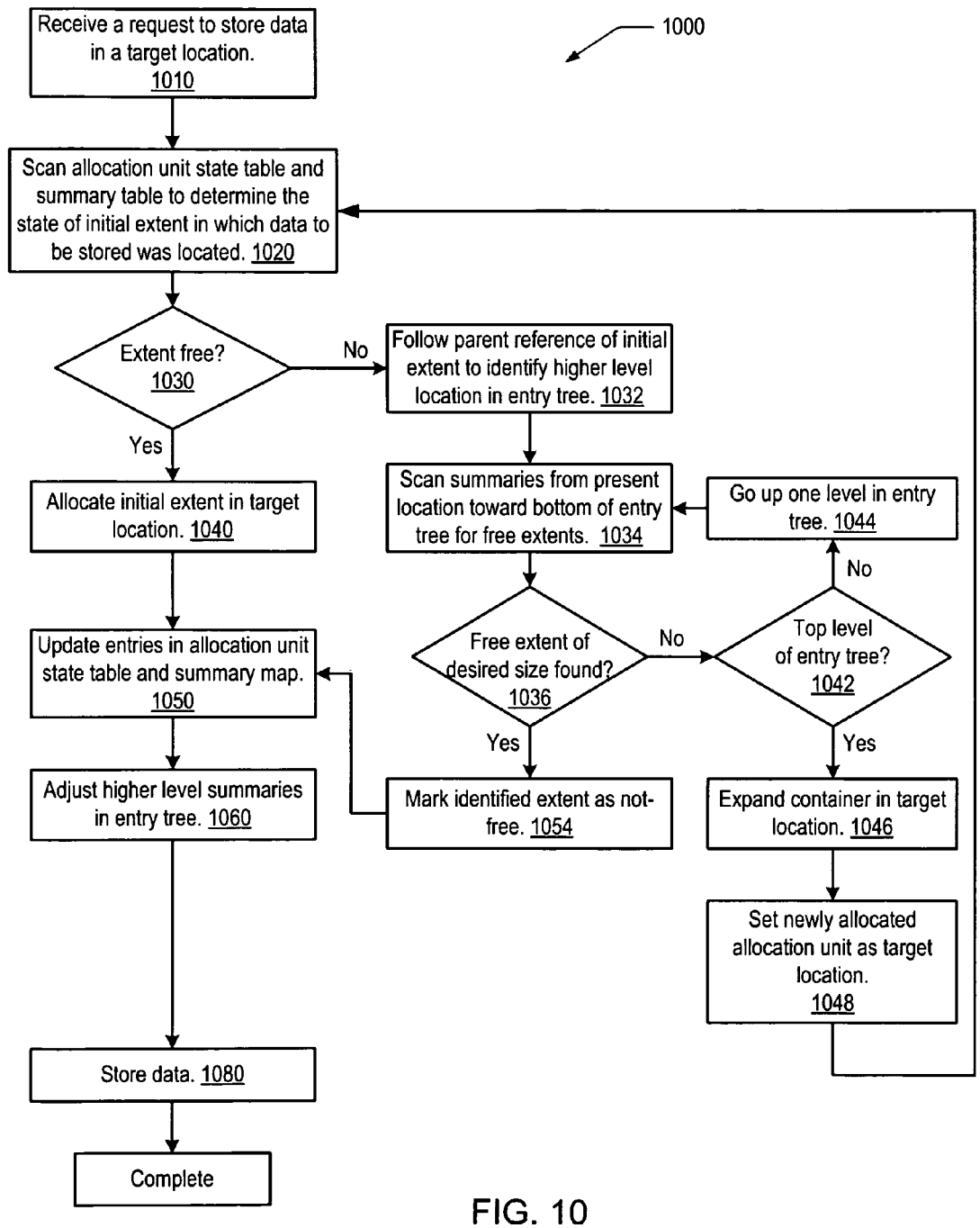
FIG. 10 illustrates one embodiment of a process that may be used to store data in a target location using an entry tree.

FIG. 9 illustrates one embodiment of a process 900 that may be used to shrink a container using an entry tree. Similar processes may be used to remove smaller or larger sets of storage entities from smaller or larger storage system partitions. Process 900 may begin with the receipt of a request to shrink a particular container (block 910), such as when there is a need change the ownership of allocation units from one container to another. In response to the request, a container summary table of the selected container may be identified (block 920) and its container summary scanned from top to bottom to find free, contiguous allocation units of the desired size to be removed from the container (block 930). Once the desired number of contiguous, free allocation units have been identified, the container ID and parent slot ID values in the allocation unit ownership table entries corresponding to the identified allocation units may be changed to reflect the shrinking of the particular container (block 940). The value of the container ID field in the corresponding allocation unit state table entries may also be changed accordingly (block 950). The higher-level summaries in the entry tree may be adjusted from bottom to top to reflect the change in assignment of the identified allocation units (block 960). In addition, higher-level indices and parent references in a container summary table may be adjusted accordingly (block 970), completing process 900. It is noted that in alternative embodiments, the individual blocks illustrated in process 900 may be executed in a different order and/or that some blocks may be executed in parallel with others.

FIG. 10 illustrates one embodiment of a process 1000 that may be used to store data in a target location using an entry tree. For purposes of discussion, the storage space required to store the desired data may be referred to as extents, although a similar process may be used to store data requiring a single block or extent, multiple extents, multiple containers, or larger storage spaces. Process 1000 may begin with the receipt of a request to store data in a target location within a storage system (block 1010). In one embodiment, the storage system may be configured to first attempt to store the data in the same extents in which the data was initially stored. For example, if a minor change has been made to the data, a filename has been changed, or some other similar operation has been performed in which the size of the data to be stored has not changed significantly it may be desirable to return the data to place in which it was initially stored. Accordingly, the initial extent in which the data was stored may be identified and a corresponding allocation unit state table may be scanned to determine the state of the identified extents (block 1020). If the identified extents are free (decision block 1030), they may be allocated in the target location (block 1040), for example, ownership of associated allocation units in which the extents are located may be granted to the target container. Entries in an allocation unit state table that correspond to the associated allocation units may be updated (block 1050). For example, in one embodiment, a container ID field and a parent slot ID field may be updated in an allocation unit ownership table and a container ID field and allocation unit state field may be updated in an allocation unit state table. The allocation unit summary map may also be updated to indicate that the extents are not free. Higher-level summaries in the entry tree may also be updated from bottom to top to reflect that the identified extents are no longer free (block 1060). Once the metadata associated with the identified extents has been updated, the data may be stored in the target location (block 1080), completing process 1000.

Returning to decision block 1030, if the identified extents are not free, the parent reference that corresponds with the initial extent in which the data was stored may be followed to a higher point in the entry tree, such as a container summary table (block 1032). The summaries may be scanned from the present location toward the bottom of the entry tree for available extents that have the same parent as the initial extent and (block 1034). If free extents that have the minimum required size to store the data are found (decision block 1036), the identified extents may be marked as not-free (block 1054). Process 1000 may then continue at block 1050, as described above. If free extents that have the minimum required size to store the data are not found (decision block 1036), and if the search for free extents has not yet reached the top level of the entry tree (decision block 1042), the entry tree may be followed to the next higher level (block 1044) and process 1000 may continue at block 1034. If the search for free extents has reached the top level of the entry tree (decision block 1042), the container in the target location may be expanded (block 1046). For example, in one embodiment, a container that corresponds with the target location may be expanded via process 800 described above, or via a similar process. Once the target location has received expanded extents, the newly allocated allocation unit may be set as corresponding to the target location (block 1048). Process 1000 may then proceed to block 1020. It is noted that in alternative embodiments, the individual blocks illustrated in process 1000 may be executed in a different order and/or that some blocks may be executed in parallel with others.

Figure 11:
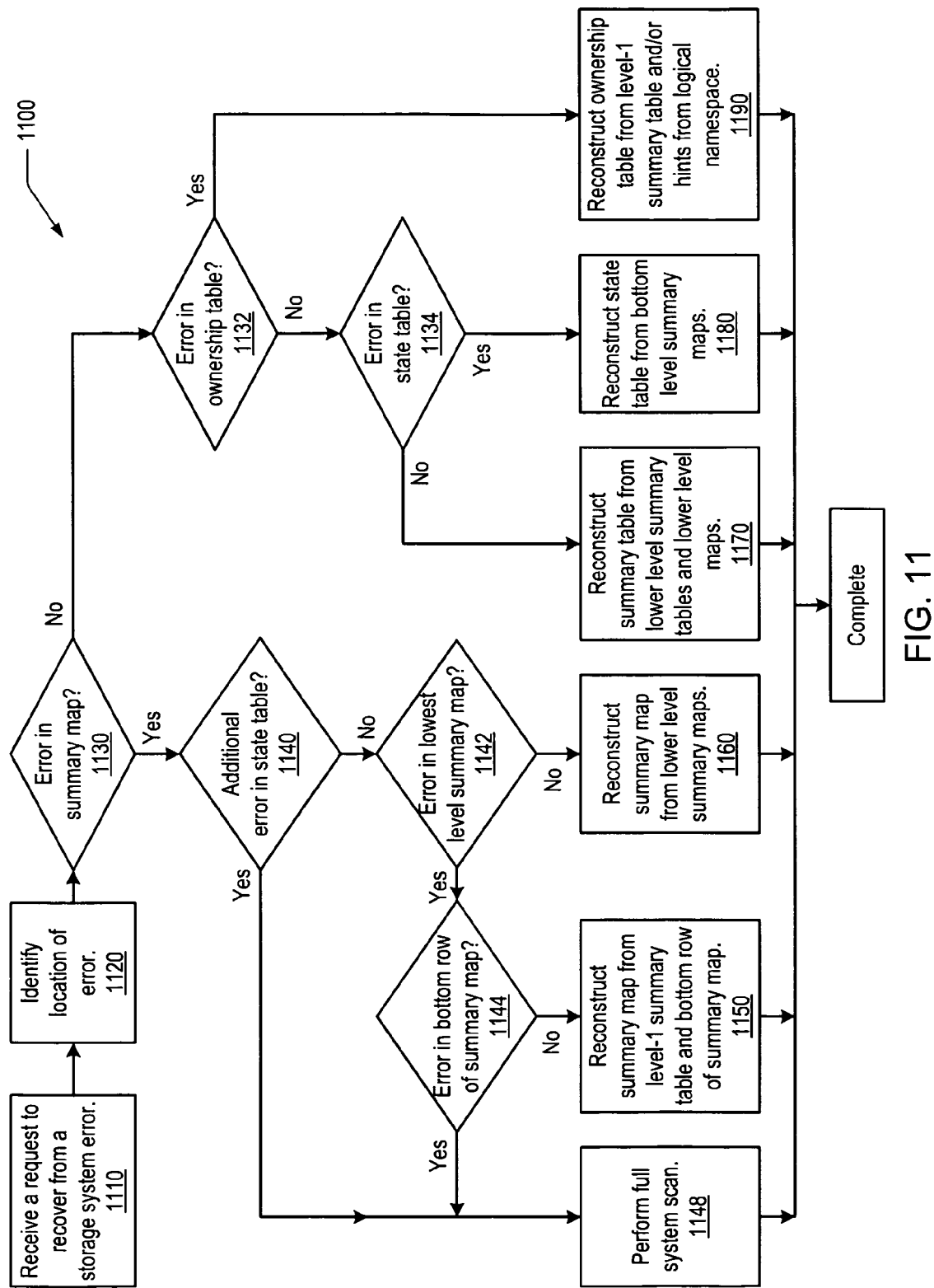
FIG. 11 illustrates one embodiment of a process that may be used to recover from metadata errors in a data storage system.

FIG. 11 illustrates one embodiment of a process 1100 that may be used to recover from metadata errors in a data storage system. Process 1100 may begin with receipt of a request to recover from a storage system error (block 1110). The location of the error may be identified in the request or it may be identified by some other error tracking process, etc. (block 1120). If the error is in a summary map (decision block 1130) and there is an additional error in an allocation unit state table (decision block 1140), then a full system scan may be performed such as via an FSCK process (block 1148), completing process 1100. In addition, if the error is in a summary map, there is not an additional error in an allocation unit state table, the error is in the lowest level of the summary map (decision block 1142), and the error is in the bottom row of the bottom level of the summary map (decision block 1144), then a full system scan may be performed such as via an FSCK process (block 1148), completing process 1100. If the error is in a summary map, there is not an additional error in a state table, the error is in the lowest level of the summary map, but the error is not in the bottom row of the bottom level of the summary map (decision block 1144), then the summary map may be reconstructed from information in the bottom row and information in the summary table at the first level above the bottom level (block 1150), completing process 1100. For example, in one embodiment, index information from a container summary table may be used to determine which container refers to an allocation unit in which the error occurred and the bottom row of the bottom level of the summary map may be used to determine the free/not-free status of each extent in the allocation unit in which the error occurred. If the error is in a summary map, there is not an additional error in a state table, but the error is not in the lowest level of the summary map (decision block 1142), then the summary map may be reconstructed from information in lower level summary maps (block 1160), completing process 1100. If the error is not in a summary map (decision block 1130) but is instead in an allocation unit ownership table (decision block 1132), then the ownership table may be reconstructed from information in the summary table at the first level above the bottom level and/or from information that may be derived from the logical namespace that is associated with the storage system (block 1190), completing process 1100. If the error is not in a summary map (decision block 1130) or an allocation unit ownership table (decision block 1132), but is instead in an allocation unit state table (decision block 1134), then the state table may be reconstructed from information in the lowest level summary maps (block 1180), completing process 1100. If the error is not in a summary map (decision block 1130), an ownership table (decision block 1132), or a state table (decision block 1134), then it is assumed to be in a portion of a higher level summary table other than the summary map and the summary table that contains the error may be reconstructed from the lower level summary tables and maps (decision block 1170), completing process 1100. It is noted that in alternative embodiments, the individual blocks illustrated in process 1100 may be executed in a different order and/or that some blocks may be executed in parallel with others.

It is further noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A storage system comprising:
one or more storage devices including a plurality of storage entities;
memory storing program instructions; and
one or more processors, wherein the program instructions are executable by the one or more processors to create a hierarchical entry tree comprising a plurality of levels describing the plurality of storage entities, wherein at a given level of the plurality of levels of the tree above a bottom level, storage entity metadata entries indicate where contiguous, unallocated storage entities available for allocation are located at each level below the given level;
wherein the program instructions are further executable by the one or more processors to:
receive a request to store data of a target size at a target location within the plurality of storage entities corresponding to a first portion of the entry tree;
scan the entry tree to determine if contiguous, unallocated storage entities of the target size are available at the target location;
determine that contiguous, unallocated storage entities of the target size are not available at the target location; and
in response to said determining that contiguous, unallocated storage entities of the target size are not available at the target location:
scan portions of the entry tree outside the first portion to identify contiguous, unallocated storage entities of the target size; and
store the data in the identified storage entities.

2. The system of claim 1, wherein storage in the storage system is based on variably sized extents.

3. The system of claim 1, wherein the program instructions are further executable by the one or more processors to:
detect that an error has occurred in a particular portion of the entry tree; and
use metadata entries from a level below the particular portion of the entry tree to repair the error at the particular portion of the entry tree.

4. The system of claim 1, wherein in said scanning the portions of the entry tree outside the first portion, the program instructions are further executable by the one or more processors to:
traverse up to a next level of the plurality of levels in the entry tree;
scan the entry tree from the next level toward the bottom of the entry tree to find contiguous, unallocated storage entities of the target size; and
if contiguous, unallocated storage entities are not found, scan the entry tree from one or more higher levels of the plurality of levels than the next level to find unallocated storage entities of the target size.

5. The system of claim 1;
wherein the entry tree further comprises one or more containers;
wherein each storage entity is associated with a container of the one or more containers; and
wherein the first portion of the entry tree comprises a particular one of the one or more containers.

6. The system of claim 5, wherein the program instructions are further executable by the one or more processors to: after scanning to a highest level of the entry tree, determine that contiguous, unallocated storage entities of the target size are not found; and associate one or more additional storage entities with the particular container.

7. The system of claim 5, wherein the program instructions are further executable by the one or more processors to:
receive a request to shrink a first container;
in response to the request to shrink a first container, scan a first portion of the entry tree corresponding to the first container;
identify one or more storage entities of a sufficient size to satisfy the request to shrink the first container; and
remove the association between the identified one or more storage entities and the first container.

8. A method comprising:
executing program instructions on one or more processors of a storage system to implement operations including:
maintaining a hierarchical entry tree comprising a plurality of levels describing a plurality of storage entities of the storage system, wherein at a given level of the plurality of levels of the tree higher than a bottom level, storage entity metadata entries indicate where contiguous, unallocated storage entities available for allocation are located at each level below the given level;
receiving a request to store data of a target size at a target location within the plurality of storage entities corresponding to a first portion of the entry tree;
scanning the entry tree to determine if contiguous, unallocated storage entities of the target size are available at the target location;
determining that contiguous, unallocated storage entities of the target size are not available at the target location; and
in response to said determining that contiguous, unallocated storage entities of the target size are not available at the target location:
scanning portions of the entry tree outside the first portion to identify contiguous, unallocated storage entities of the target size; and
storing the data in the identified storage entities.

9. The method of claim 8, wherein storage in the storage system is based on variably sized extents.

10. The method of claim 8, further comprising:
executing additional program instructions on the one or more processors of the storage system to implement additional operations including:
detecting that an error has occurred in a particular portion of the entry tree; and
using metadata entries from a level below the particular portion of the entry tree to repair the error at the particular portion of the entry tree.

11. The method of claim 8, wherein scanning portions of the entry tree outside the first portion comprises:
traversing up to a next level of the plurality of levels in the entry tree;
scanning the entry tree from the next level toward the bottom of the entry tree to find contiguous, unallocated storage entities of the target size; and
if contiguous, unallocated storage entities are not found, scanning the entry tree from one or more higher levels of the plurality of levels than the next level to find unallocated storage entities of the target size.

12. The method of claim 8;
wherein the entry tree further comprises one or more containers;
wherein each storage entity is associated with a container of the one or more containers; and
wherein the first portion of the entry tree comprises a particular one of the one or more containers.

13. The method of claim 12, wherein if after scanning to a highest level of the entry tree, contiguous, free storage entities of the target size are not found, the method further comprises executing additional program instructions on the one or more processors of the storage system to implement one or more additional operations including: associating one or more additional storage entities with the particular container.

14. The method of claim 12, further comprising:
executing additional program instructions on the one or more processors of the storage system to implement additional operations including:
receiving a request to shrink a first container;
in response to the request to shrink a first container, scanning a first portion of the entry tree corresponding to the first container;
identifying one or more storage entities of a sufficient size to satisfy the request to shrink the first container; and
removing the association between the identified one or more storage entities and the first container.

15. A plurality of non-transitory computer readable storage media storing computer instructions that are executable by one or more processors to:
maintain a hierarchical entry tree comprising a plurality of levels describing storage entities of a storage system, wherein at each given level of the plurality of levels of the tree higher than the bottom level, storage entity metadata entries indicate where contiguous, unallocated storage entities available for allocation are located at each level below the given level;
receive a request to store data of a target size at a target location corresponding to a first portion of the entry tree;
scan the entry tree to determine if contiguous, unallocated storage entities of the target size are available at the target location;
determine that contiguous, unallocated storage entities of the target size are not available at the target location; and
in response to determining that contiguous, unallocated storage entities of the target size are not available at the target location:
scan portions of the entry tree outside the first portion to identify contiguous, unallocated storage entities of the target size; and
store the data in the identified storage entities.

16. The non-transitory computer readable storage media of claim 15, wherein the instructions are further executable by the one or more processors to:
detect that an error has occurred in a particular portion of the entry tree; and
use metadata entries from a level below the particular portion of the entry tree to repair the error at the particular portion of the entry tree.

17. The non-transitory computer readable storage media of claim 15, wherein to scan portions of the entry tree outside the first portion, the instructions are further executable by the one or more processors to:
traverse up to a next level of the plurality of levels in the entry tree;
scan the entry tree from the next level toward the bottom of the entry tree to find contiguous, unallocated storage entities of the target size; and
if contiguous, unallocated storage entities are not found, scan the entry tree from one or more higher levels of the plurality of levels than the next level to find unallocated storage entities of the target size.

18. The non-transitory computer readable storage media of claim 15;
wherein the entry tree further comprises one or more containers;
wherein each storage entity is associated with a container of the one or more containers; and
wherein the first portion of the entry tree comprises a particular one of the one or more containers.

19. The non-transitory computer readable storage media of claim 18, wherein if after scanning to a highest level of the entry tree, contiguous, unallocated storage entities of the target size are not found, the instructions are further executable by the one or more processors to associate one or more additional storage entities with the particular container.

20. The non-transitory computer readable storage media of claim 18, wherein the instructions are further executable by the one or more processors to:
receive a request to shrink a first container;
in response to the request to shrink a first container, scan a first portion of the entry tree corresponding to the first container;
identify one or more storage entities of a sufficient size to satisfy the request to shrink the first container; and
remove the association between the identified one or more storage entities and the first container.

* * * * *